United States Patent
Biller et al.

(10) Patent No.: US 10,708,282 B2
(45) Date of Patent: Jul. 7, 2020

(54) UNAUTHORIZED DATA ACCESS DETECTION BASED ON CYBER SECURITY IMAGES

(71) Applicant: International Business Machines Corporation, Armonk, NY (US)

(72) Inventors: Ofer Biller, Midreshet Ben-Gurion (IL); Rosa Miroshnikov, Vaughan (CA); David Rozenblat, Nes Harim (IL); Oded Sofer, Jerusalm (IL)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 15/469,985

(22) Filed: Mar. 27, 2017

(65) Prior Publication Data

US 2018/0278630 A1  Sep. 27, 2018

(51) Int. Cl.
  *H04L 29/06* (2006.01)
  *G06F 21/56* (2013.01)
  *H04L 29/08* (2006.01)

(52) U.S. Cl.
  CPC ........ *H04L 63/1416* (2013.01); *G06F 21/566* (2013.01); *H04L 63/10* (2013.01); *H04L 63/102* (2013.01); *H04L 63/1441* (2013.01); *H04L 67/04* (2013.01); *H04L 67/10* (2013.01); *H04L 67/36* (2013.01)

(58) Field of Classification Search
  CPC .... G06F 21/554; G06F 21/562; G06F 21/566; H04L 63/1416; H04L 63/10; H04L 63/102; H04L 63/1441; H04L 67/04; H04L 67/10; H04L 67/36

USPC ............................................................. 726/4
See application file for complete search history.

(56) References Cited

U.S. PATENT DOCUMENTS

| 5,825,750 | A * | 10/1998 | Thompson | H04J 3/14 370/244 |
| 6,405,318 | B1 * | 6/2002 | Rowland | G06F 21/552 726/22 |
| 8,887,281 | B2 * | 11/2014 | Honig | G06F 21/554 726/23 |

(Continued)

FOREIGN PATENT DOCUMENTS

| EP | 2882159 A1 | 6/2015 |
| WO | 2016025226 A1 | 2/2016 |

OTHER PUBLICATIONS

"F-Secure Security Cloud API Now Available on AWS Marketplace"; Yahoo Sports; Nov. 29, 2016; 5 pages. http://sports.yahoo.com/news/f-secure-security-cloud-api-174941612.html.

(Continued)

*Primary Examiner* — Kambiz Zand
*Assistant Examiner* — Mahabub S Ahmed

(57) ABSTRACT

In some examples, a system for detecting unauthorized data access can include a processor to detect a suspicious operation to be executed by the system and review a plurality of highlights corresponding to the suspicious operation. The processor can also determine that a predefined cyber security image corresponding to the highlights and the suspicious operation does not exist and generate the predefined cyber security image based on a plurality of sub-cyber security images. Furthermore, the processor can store the predefined cyber security image in a cyber security image repository and prevent the suspicious operation from being executed.

20 Claims, 5 Drawing Sheets

(56) References Cited

U.S. PATENT DOCUMENTS

| | | | |
|---|---|---|---|
| 9,185,095 B1* | 11/2015 | Moritz | H04L 63/102 |
| 9,202,249 B1* | 12/2015 | Cohen | G06F 16/285 |
| 9,258,321 B2 | 2/2016 | Amsler et al. | |
| 9,609,456 B2* | 3/2017 | Valencia | G06F 8/71 |
| 9,838,413 B2* | 12/2017 | Srinivasan | H04L 63/10 |
| 10,038,700 B1* | 7/2018 | Duchin | H04L 63/102 |
| 2004/0122832 A1* | 6/2004 | Heil | G06F 11/1464 |
| 2011/0283351 A1* | 11/2011 | Hudson, Jr. | H04L 63/0457 |
| | | | 726/14 |
| 2013/0097709 A1* | 4/2013 | Basavapatna | G06F 21/552 |
| | | | 726/25 |
| 2013/0305357 A1* | 11/2013 | Ayyagari | H04W 12/06 |
| | | | 726/22 |
| 2013/0305358 A1* | 11/2013 | Gathala | G06F 21/56 |
| | | | 726/22 |
| 2014/0165207 A1* | 6/2014 | Engel | H04L 63/1425 |
| | | | 726/25 |
| 2015/0058984 A1* | 2/2015 | Shen | G06F 21/52 |
| | | | 726/23 |
| 2015/0178496 A1* | 6/2015 | Kohlenberg | G06F 21/316 |
| | | | 726/23 |
| 2016/0021056 A1* | 1/2016 | Chesla | H04L 63/02 |
| | | | 726/11 |
| 2016/0072836 A1 | 3/2016 | Hadden et al. | |
| 2016/0321574 A1 | 11/2016 | Peterson | |
| 2016/0330219 A1* | 11/2016 | Hasan | H04L 63/1408 |
| 2017/0214701 A1* | 7/2017 | Hasan | H04L 63/1408 |
| 2018/0159869 A1* | 6/2018 | Cordoba Lefler | H04L 63/1416 |
| 2018/0167402 A1* | 6/2018 | Scheidler | G06F 21/552 |
| 2018/0196941 A1* | 7/2018 | Ruvio | H04L 63/1425 |
| 2018/0255094 A1* | 9/2018 | Doron | H04L 63/1458 |
| 2018/0270197 A1* | 9/2018 | Subramanian | H04L 43/50 |
| 2018/0295142 A1* | 10/2018 | Manadhata | H04L 67/42 |

OTHER PUBLICATIONS

Massimo Ficco; "A Weight-Based Symptom Correlation Approach to SQL Injection Attacks"; Sep. 1, 2009; 7 pages. http://www.academia.edu/15218139/A_Weight-Based_Symptom_Correlation_Approach_to_SQL_Injection_Attacks.

* cited by examiner

# UNAUTHORIZED DATA ACCESS DETECTION BASED ON CYBER SECURITY IMAGES

BACKGROUND

The present disclosure relates to cyber security, and more specifically, but not exclusively, to detecting unauthorized data access based on cyber security images.

SUMMARY

According to an embodiment described herein, a system for detecting unauthorized access of data can include a processor to detect a suspicious operation to be executed by the system and review a plurality of highlights corresponding to the suspicious operation. The processor can also determine that a predefined cyber security image corresponding to the plurality of highlights and the suspicious operation does not exist and generate the predefined cyber security image comprising a plurality of sub-cyber security images based on the plurality of highlights. The processor can also store the predefined cyber security image in a cyber security image repository and prevent the suspicious operation from being executed.

According to another embodiment, a method for detecting unauthorized data access can include detecting a suspicious operation to be executed by the system and reviewing a plurality of highlights corresponding to the suspicious operation. The method can also include determining that a predefined cyber security image corresponding to the highlights and the suspicious operation does not exist and generating the predefined cyber security image based on a plurality of sub-cyber security images. The method can also include storing the predefined cyber security image in a cyber security image repository and preventing the suspicious operation from being executed.

According to another embodiment, a computer program product for detecting unauthorized data access can include a computer readable storage medium having program instructions embodied therewith, wherein the computer readable storage medium is not a transitory signal per se. The program instructions can be executable by a processor to cause the processor to detect a suspicious operation to be executed by the system. The program instructions can also be executable by a processor to cause the processor to review a plurality of highlights corresponding to the suspicious operation and determine that a predefined cyber security image corresponding to the highlights and the suspicious operation does not exist. The program instructions can also be executable by a processor to cause the processor to generate the predefined cyber security image based on a plurality of sub-cyber security images, store the predefined cyber security image in a cyber security image repository, and prevent the suspicious operation from being executed.

DETAILED DESCRIPTION

Cyber-attacks in which unauthorized users attempt to access data can involve complex investigations that include various computing devices, users, software applications, and the like. Furthermore, cyber-attacks may correspond to an unauthorized access of confidential information. Accordingly, sharing details regarding cyber-attacks can involve anonymizing accessed data, which can be time consuming and expensive. The techniques described herein include a protocol for investigation of complex cyber-attacks, which enables the generation of application programming interfaces (APIs) that can analyze cyber-attacks and associate events to provide additional information regarding a cyber-attack.

In some embodiments, a device for detecting unauthorized access of data can detect a suspicious operation to be executed by a system and review a plurality of highlights corresponding to the suspicious operation. The device can also determine that a predefined cyber security image corresponding to the highlights and the suspicious operation does not exist and generate a predefined cyber security image based on a plurality of sub-cyber security images. Furthermore, the device can store the predefined cyber security image in a cyber security image repository and prevent the suspicious operation from being executed.

Accordingly, the techniques described herein can reduce a number of unauthorized operations performed by a computing device or remote service provider. Furthermore, the techniques described herein can prevent the execution of operations that may result in an unauthorized access of data from a computing device, mobile device, server, or any other suitable device.

Figure 1:
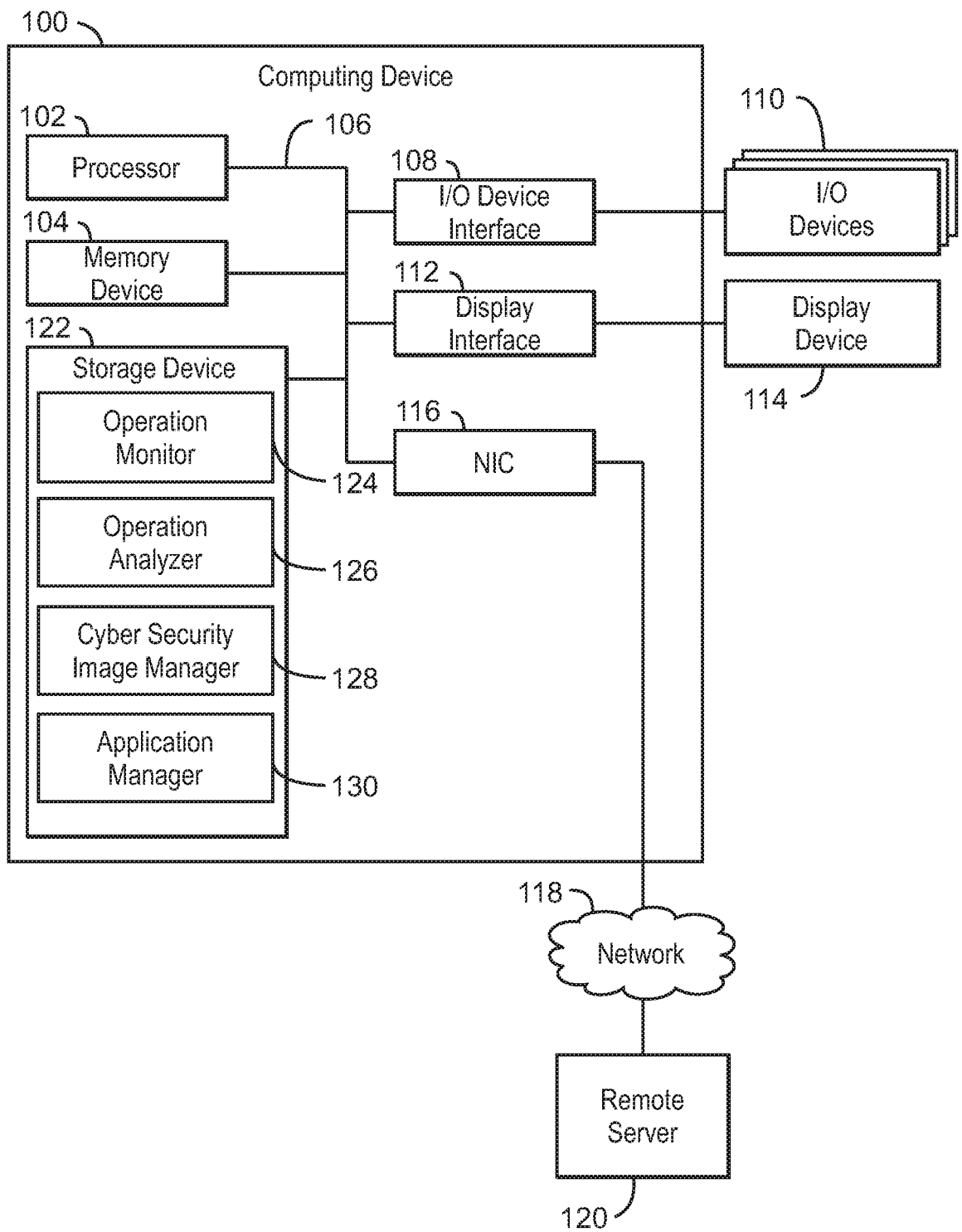
FIG. 1 depicts a block diagram of an example computing system that can detect an unauthorized data access based on a cyber security image according to an embodiment described herein.

With reference now to FIG. 1, an example computing device is depicted that can detect an unauthorized access of data. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118. In some examples, the remote server 120 can send an authentication request for a transaction to the computing device 100.

The processor 102 may also be linked through the system interconnect 106 to a storage device 122 that can include a hard drive, an optical drive, a USB flash drive, an array of drives, or any combinations thereof. In some examples, the storage device 122 may include an operation monitor 124 that can detect a suspicious operation to be executed by the computing device 100. In some examples, an operation analyzer 126 can review a plurality of highlights corresponding to the suspicious operation and determine that a predefined cyber security image corresponding to the highlights and the suspicious operation does not exist. In some embodiments, a cyber security image manager 128 can generate a predefined cyber security image based on a plurality of sub-cyber security images and store the predefined cyber security image in a cyber security image repository. In some embodiments, an application manager 130 can prevent the suspicious operation from being executed in response to detecting the suspicious operation matches a predefined cyber security image.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the operation monitor 124, operation analyzer 126, cyber security image manager 128, and application manager 130 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the operation monitor 124, operation analyzer 126, cyber security image manager 128, and application manager 130 can be implemented with logic, wherein the logic, as referred to herein, can include any suitable hardware (e.g., a processor, among others), software (e.g., an application, among others), firmware, or any suitable combination of hardware, software, and firmware.

Figure 2:
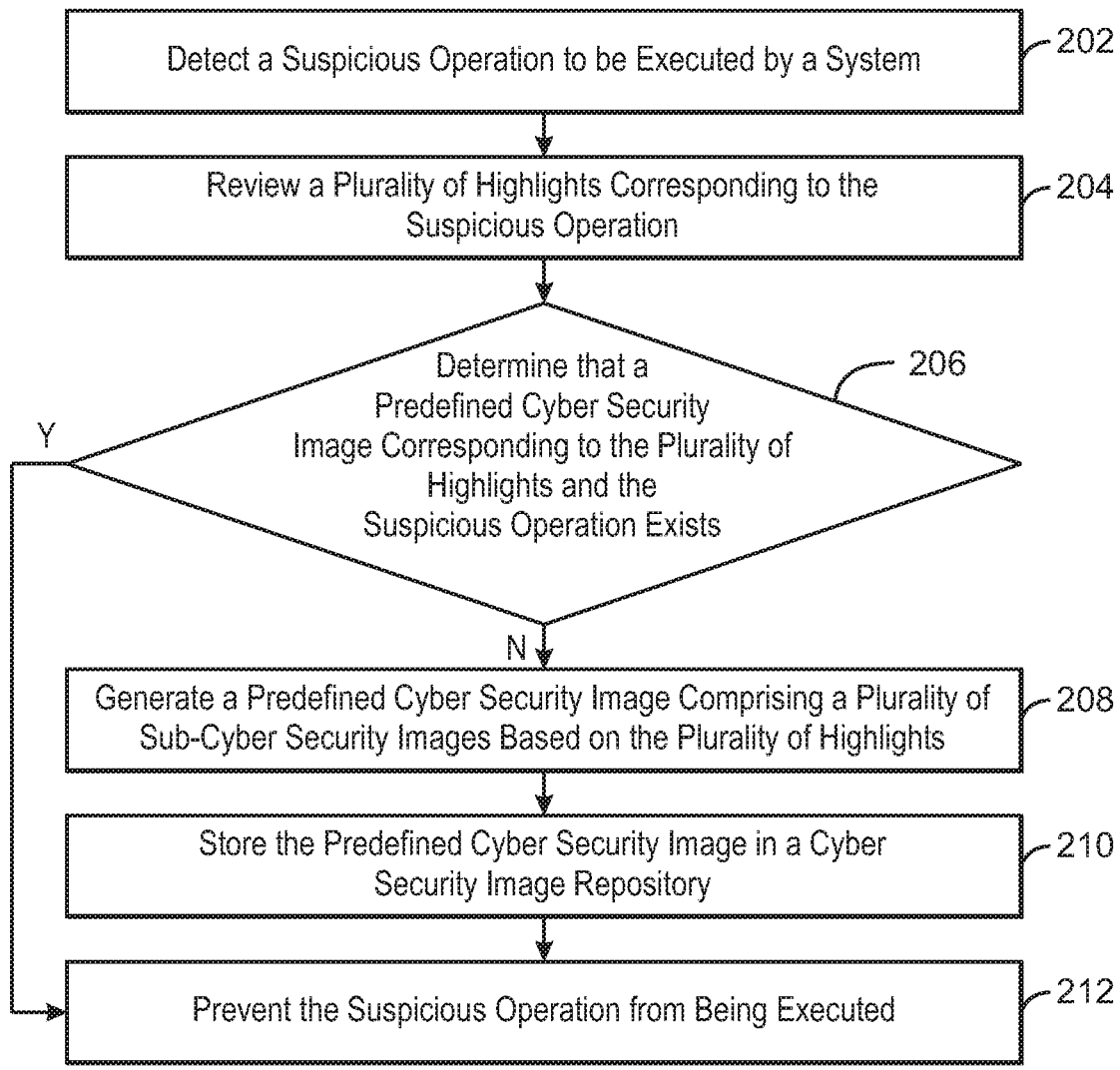
FIG. 2 is a process flow diagram of an example method that can detect an unauthorized data access based on a cyber security image according to an embodiment described herein.

FIG. 2 is a process flow diagram of an example method that can detect an unauthorized access of data. The method 200 can be implemented with any suitable computing device, such as the computing device 100 of FIG. 1.

At block 202, an operation monitor 124 can detect a suspicious operation to be executed by the system. In some embodiments, the suspicious operation can include an operation that generates a number of errors or failures above a predetermined threshold. The suspicious operation can also include operations that result in a volume of activity that exceeds a predetermined threshold. Additionally, the suspicious operation can include a change in lines of code of an application or database, among others.

At block 204, an operation analyzer 126 can review a plurality of highlights corresponding to the suspicious operation. In some embodiments, the plurality of highlights can include the number of errors generated by the suspicious operation, the number of lines of code that are changed by the suspicious operation, a number of login attempts by the suspicious operation, and the like. In some examples, the plurality of highlights can indicate whether a suspicious operation attempts to store scripting characters in a database or enter scripting characters into a website. The plurality of highlights can also indicate whether the suspicious operation may result in a denial of service for a server or website.

At block 206, the operation analyzer 126 can determine if a predefined cyber security image corresponding to the highlights and the suspicious operation exists. As discussed above, a predefined cyber security image can include any number of user profiles, server profiles, activity profiles or activity data sets, error profiles or error data sets, and violation profiles or violation data sets associated with any number of operations. In some examples, the user profiles, server profiles, activity profiles, error profiles, and violation profiles are stored as sub-cyber security images. The operation analyzer 126 can compare the highlights corresponding to a suspicious operation to sub-cyber security images corresponding to a cyber security image to determine if a suspicious operation has been previously detected. For example, the operation analyzer 126 can compare highlights, such as a user identity and a number of lines of application source code that have been changed, to a user profile and an activity profile for the user. The process can continue at block 208 if a cyber security image does not exist for the highlights and the suspicious operation. If the cyber security image does exist for the highlights and the suspicious operation, the process can continue at block 212.

At block 208, a cyber security image manager 128 can generate the predefined cyber security image based on a plurality of sub-cyber security images. For example, the cyber security image manager 128 can generate the predefined cyber security image using information from the plurality of highlights corresponding to a suspicious operation. In some examples, the cyber security manager 128 can also detect additional information corresponding to user profiles, server profiles, activity data sets, error data sets, and violation data sets associated with the suspicious operation.

In some embodiments, a server profile can include a number of requests during a period of time, a number of data source instances, a number of database users, a number of operating system users, a number of objects accessed, a number of commands, a number of records per request, a response time per request, a list of active hours, a peak hour, or any combination thereof. In some examples, a user profile can include a number of requests during a period of time, a number of accessed data sources, a number of clients, a number of objects accessed, a number of commands, a number of records per request, a response time per request, a list of active hours, or any combination thereof. In some embodiments, activity data sets can include a number of activities during a period of time, a number of objects per activity, a number of commands, a number of records per request, a response time per request, a list of active hours, a peak hour, or any combination thereof. In some embodiments, error data sets can include a list of error types, a number of errors per period of time, a number of users with errors, a frequency of errors, or any combination thereof. In some embodiments, violation data sets can include a list of violation types, a number of violations per period of time, a number of users with at least one violation, a frequency of violation, or any combination thereof.

In some embodiments, the predefined cyber security image can correspond to a suspicious operation such as a structured query language (SQL) injection. The SQL injection may include a union exploitation technique in which a union operator is used to join a forged query to an original query. The result of the forged query can be joined to the result of the original query, which allows an unauthorized user to obtain values of columns of other tables. In some examples, the predefined security image can indicate that a forged query originates from an unauthorized user accessing a database via the same application server, source program, and shared user as the original query. The forged query can detect unauthorized information such as sensitive table names, a number of columns in a database table, column types, and the like. In some examples, multiple forged queries can be used based on a trial-and-error technique to detect the unauthorized information. The cyber security image may include a user profile value indicating a general view of a user's profile, a count of errors per type per time window, access to sensitive table statistics, errors associated with sensitive table access, a frequency of errors, access to information schema, session statistics, and an outlier identified within this time window.

In some embodiments, a cyber security image that includes this information can be attached to a SQL injection attack type and can be used to analyze potential SQL injection attacks. In some examples, the cyber security image can be shared between multiple parties to enable modifications to the cyber security image to improve the reliability of detecting SQL injections with the cyber security image.

At block 210, the cyber security image manager 128 can store the predefined cyber security image in a cyber security image repository. In some examples, the cyber security image repository can store any number of cyber security images corresponding to any number of suspicious operations. In some embodiments, multiple suspicious operations can be associated with one or more cyber security images.

At block 212, an application manager 130 can prevent the suspicious operation from being executed. For example, the application manager 130 can prevent a suspicious operation from modifying a database, modifying source code of an application, storing scripting characters in a database or website, providing a number of incorrect login credentials, and the like. In some embodiments, the application manager 130 can prevent a suspicious operation from being executed based on a previously stored cyber security image that matches the suspicious operation. For example, a suspicious operation may be associated with highlights that have been previously analyzed and stored in a cyber security image. By preventing execution of the suspicious operation, the application manager 130 can prevent an unauthorized access of data.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, a cyber security image manager 128 can detect a second suspicious operation to be executed by the system, review a second plurality of highlights corresponding to the second suspicious operation, determine that a second predefined cyber security image corresponding to the second plurality of highlights and the second suspicious operation exists in the cyber security image repository, and prevent the second suspicious operation from being executed in response to detecting the second suspicious operation matches the second predefined cyber security image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
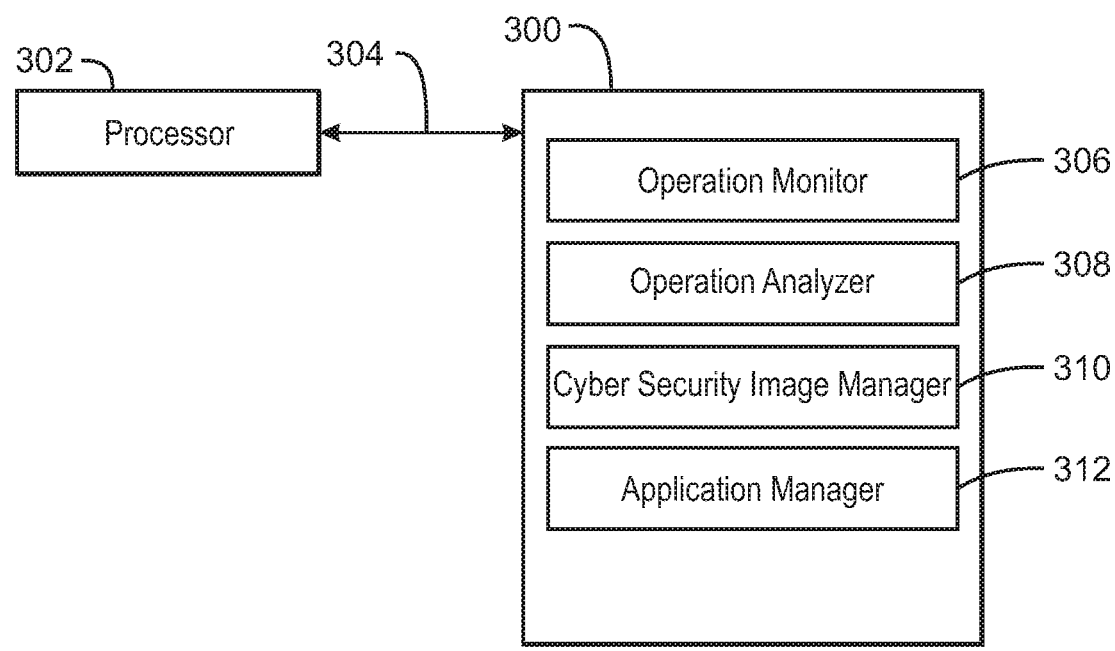
FIG. 3 is a tangible, non-transitory computer-readable medium that can detect an unauthorized data access based on a cyber security image according to an embodiment described herein.

Referring now to FIG. 3, a block diagram is depicted of an example of a tangible, non-transitory computer-readable medium that can detect an unauthorized data access. The tangible, non-transitory, computer-readable medium 300 may be accessed by a processor 302 over a computer interconnect 304.

Furthermore, the tangible, non-transitory, computer-readable medium 300 may include code to direct the processor 302 to perform the operations of the current method. For example, an operation monitor 306 can detect a suspicious operation to be executed by the system. In some embodiments, an operation analyzer 308 can review a plurality of highlights corresponding to the suspicious operation and determine that a predefined cyber security image corresponding to the plurality of highlights and the suspicious operation does not exist. A cyber security image manager 310 can generate the predefined cyber security image comprising a plurality of sub-cyber security images based on the plurality of highlights and store the predefined cyber security image in a cyber security image repository. In some examples, an application manager 312 can prevent the suspicious operation from being executed.

It is to be understood that any number of additional software components not shown in FIG. 3 may be included within the tangible, non-transitory, computer-readable medium 300, depending on the specific application. Furthermore, fewer software components than those shown in FIG. 3 can be included in the tangible, non-transitory, computer-readable medium 300.

Figure 4:
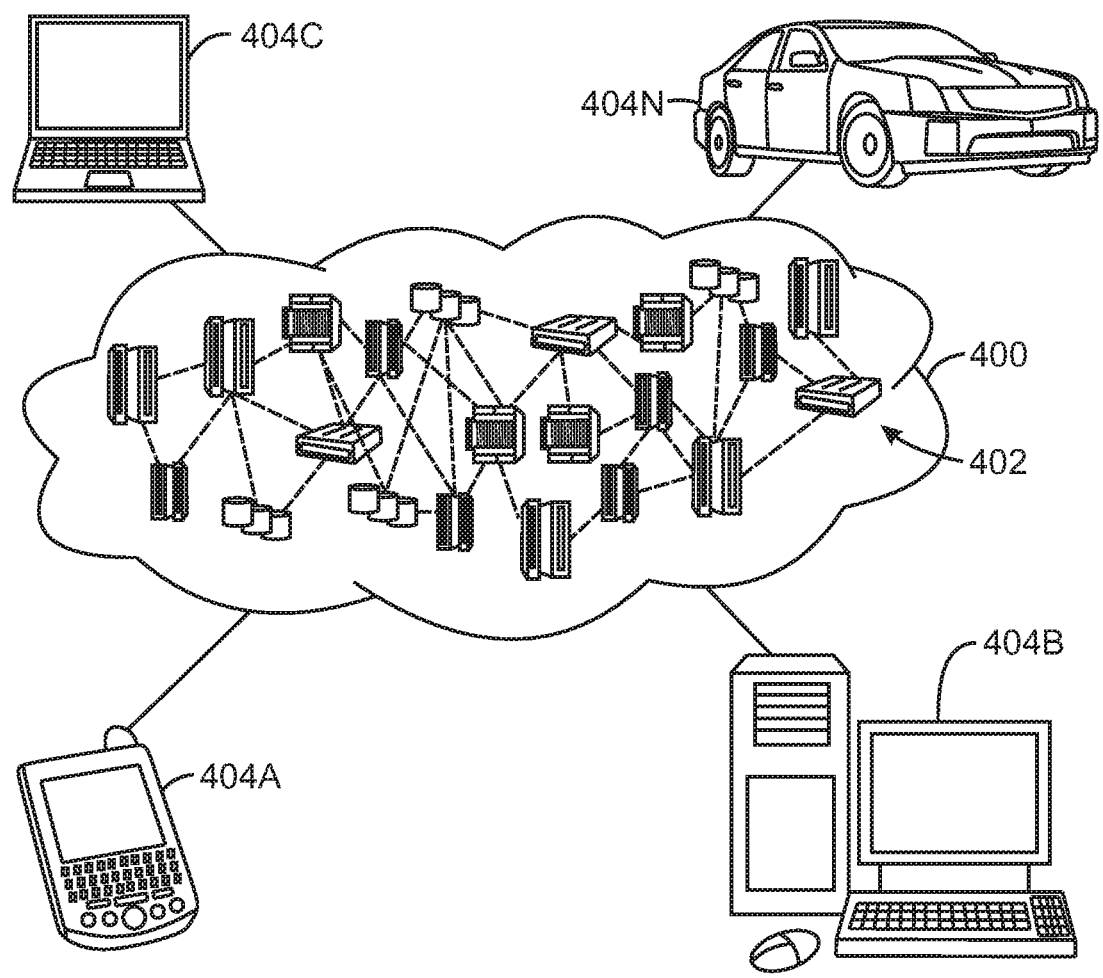
FIG. 4 depicts an illustrative cloud computing environment according to an embodiment described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
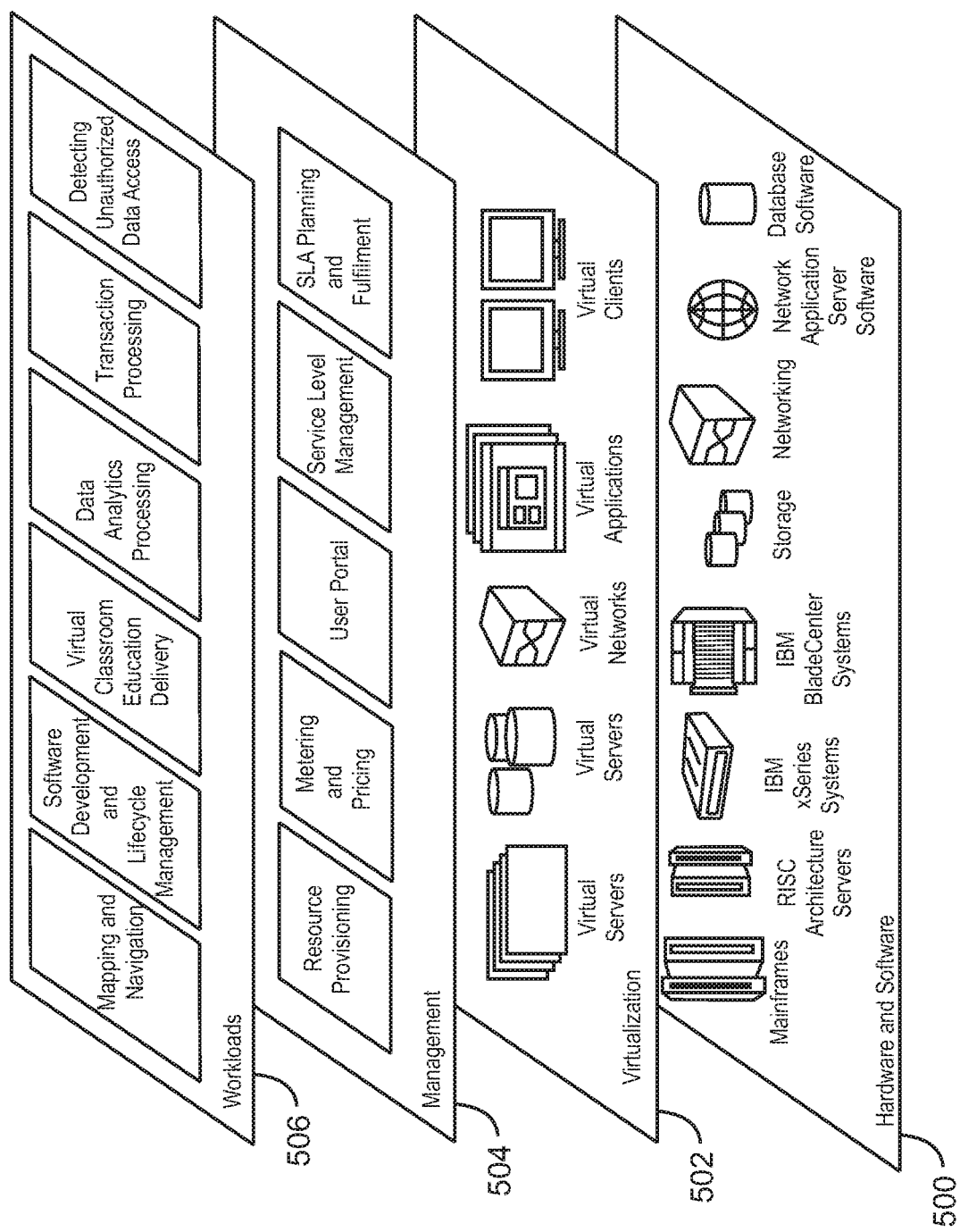
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and detecting unauthorized data access.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting unauthorized access of data comprising:
   a hardware processor to:
   detect a suspicious operation to be executed by the system;
   review a plurality of highlights corresponding to the suspicious operation;
   determine that a predefined cyber security image corresponding to the plurality of highlights and the suspicious operation does not exist;
   generate the predefined cyber security image comprising a plurality of sub-cyber security images based on the plurality of highlights;
   store the predefined cyber security image in a cyber security image repository, wherein the predefined cyber security image comprises a server profile indicating a number of records per request corresponding to an unauthorized user accessing a database from a server associated with the server profile;
   prevent the suspicious operation from being executed; and
   prevent a second suspicious operation from being executed in response to detecting the second suspicious operation matches the predefined cyber security image.

2. The system of claim 1, wherein the hardware processor is to:
   detect a second suspicious operation to be executed by the system;
   review a second plurality of highlights corresponding to the second suspicious operation;
   determine that a second predefined cyber security image corresponding to the second plurality of highlights and the second suspicious operation exists in the cyber security image repository; and
   prevent the second suspicious operation from being executed in response to detecting the second suspicious operation matches the second predefined cyber security image.

3. The system of claim 1, wherein the predefined cyber security image further comprises a user profile, an activities data set, an error data set, and a violation data set.

4. The system of claim 3, wherein the server profile comprises a number of requests during a period of time, a number of data source instances, a number of database users, a number of operating system users, a number of objects accessed, a number of commands, a response time per request, a list of active hours, a peak hour, or any combination thereof.

5. The system of claim 3, wherein the user profile comprises a number of requests during a period of time, a number of accessed data sources, a number of clients, a number of objects accessed, a number of commands, a number of records per request, a response time per request, a list of active hours, or any combination thereof.

6. The system of claim 3, wherein the activities data set comprises a number of activities during a period of time, a number of objects per activity, a number of commands, a number of records per request, a response time per request, a list of active hours, a peak hour, or any combination thereof.

7. The system of claim 3, wherein the error data set comprises a list of error types, a number of errors per period of time, a number of users with errors, a frequency of errors, or any combination thereof.

8. The system of claim 3, wherein the violation data set comprises a list of violation types, a number of violations per period of time, a number of users with at least one violation, a frequency of violation, or any combination thereof.

9. A method for detecting unauthorized data access comprising:
   detecting, via a hardware processor, a suspicious operation to be executed by the system;
   reviewing, via the hardware processor, a plurality of highlights corresponding to the suspicious operation;
   determining, via the hardware processor, that a predefined cyber security image corresponding to the highlights and the suspicious operation exists;
   generating, via the hardware processor, the predefined cyber security image based on a plurality of sub-cyber security images;
   storing, via the hardware processor, the predefined cyber security image in a cyber security image repository, wherein the predefined cyber security image comprises a server profile indicating a number of records per request corresponding to an unauthorized user accessing a database from a server associated with the server profile;
   preventing, via the hardware processor, the suspicious operation from being executed; and
   prevent a second suspicious operation from being executed in response to detecting the second suspicious operation matches the predefined cyber security image.

10. The method of claim 9, comprising:
    detecting, via the hardware processor, a second suspicious operation to be executed by the system;
    reviewing, via the hardware processor, a second plurality of highlights corresponding to the second suspicious operation;
    determining, via the hardware processor, that a second predefined cyber security image corresponding to the second plurality of highlights and the second suspicious operation exists in the cyber security image repository; and
    preventing, via the hardware processor, the second suspicious operation from being executed in response to detecting the second suspicious operation matches the second predefined cyber security image.

11. The method of claim 9, wherein the predefined cyber security image further comprises a user profile, an activities data set, an error data set, and a violation data set.

12. The method of claim 11, wherein the server profile comprises a number of requests during a period of time, a number of data source instances, a number of database users, a number of operating system users, a number of objects accessed, a number of commands, a response time per request, a list of active hours, a peak hour, or any combination thereof.

13. The method of claim 11, wherein the user profile comprises a number of requests during a period of time, a number of accessed data sources, a number of clients, a number of objects accessed, a number of commands, a number of records per request, a response time per request, a list of active hours, or any combination thereof.

14. The method of claim 11, wherein the activities data set comprises a number of activities during a period of time, a number of objects per activity, a number of commands, a number of records per request, a response time per request, a list of active hours, a peak hour, or any combination thereof.

15. The method of claim 11, wherein the error data set comprises a list of error types, a number of errors per period of time, a number of users with errors, a frequency of errors, or any combination thereof.

16. The method of claim 11, wherein the violation data set comprises a list of violation types, a number of violations per period of time, a number of users with at least one violation, a frequency of violation, or any combination thereof.

17. A computer program product for detecting unauthorized data access, the computer program product comprising a computer readable storage medium having program instructions embodied therewith, wherein the computer readable storage medium is not a transitory signal per se, the program instructions executable by a processor to cause the processor to:
    detect a suspicious operation to be executed by the system;
    review a plurality of highlights corresponding to the suspicious operation;
    determine that a predefined cyber security image corresponding to the highlights and the suspicious operation does not exist;
    generate the predefined cyber security image based on a plurality of sub-cyber security images;
    store the predefined cyber security image in a cyber security image repository, wherein the predefined cyber security image comprises a server profile indicating a number of records per request corresponding to an unauthorized user accessing a database from a server associated with the server profile;
    prevent the suspicious operation from being executed; and
    prevent a second suspicious operation from being executed in response to detecting the second suspicious operation matches the predefined cyber security image.

18. The computer program product of claim 17, wherein the program instructions cause the processor to:
    detect a second suspicious operation to be executed by the system;
    review a second plurality of highlights corresponding to the second suspicious operation;
    determine that a second predefined cyber security image corresponding to the second plurality of highlights and the second suspicious operation exists in the cyber security image repository; and
    prevent the second suspicious operation from being executed in response to detecting the second suspicious operation matches the second predefined cyber security image.

19. The computer program product of claim 17, wherein the predefined cyber security image further comprises a user profile, an activities data set, an error data set, and a violation data set.

20. The computer program product of claim 19, wherein the server profile comprises a number of requests during a period of time, a number of data source instances, a number of database users, a number of operating system users, a number of objects accessed, a number of commands, a response time per request, a list of active hours, a peak hour, or any combination thereof.

* * * * *